(12) United States Patent
Ishihara et al.

(10) Patent No.: US 10,166,852 B2
(45) Date of Patent: Jan. 1, 2019

(54) VEHICLE BODY LOWER STRUCTURE

(71) Applicant: Honda Motor Co.,Ltd., Tokyo (JP)

(72) Inventors: Yuya Ishihara, Saitama (JP); Daisuke Komazawa, Saitama (JP); Tomohiro Fukazu, Saitama (JP)

(73) Assignee: Honda Motor Co.,Ltd., Tokyo (JP)

( * ) Notice: Subject to any disclaimer, the term of this patent is extended or adjusted under 35 U.S.C. 154(b) by 0 days.

(21) Appl. No.: 15/712,150

(22) Filed: Sep. 22, 2017

(65) Prior Publication Data
US 2018/0086192 A1 Mar. 29, 2018

(30) Foreign Application Priority Data

Sep. 27, 2016 (JP) .................. 2016-188247

(51) Int. Cl.
*B60K 1/04* (2006.01)
*B60L 11/18* (2006.01)
*B60L 15/00* (2006.01)
*B60R 16/02* (2006.01)
(Continued)

(52) U.S. Cl.
CPC ............ *B60K 1/04* (2013.01); *B60L 11/1877* (2013.01); *B60L 15/007* (2013.01); *B60R 16/0207* (2013.01); *B62D 21/157* (2013.01); *B62D 25/2036* (2013.01); *B60K 2001/0438* (2013.01); *B60L 11/1803* (2013.01); *B60L 2210/42* (2013.01); *B60Y 2200/90* (2013.01); *B60Y 2306/01* (2013.01); *B60Y 2400/112* (2013.01)

(58) Field of Classification Search
CPC ..... B60K 1/04; B60L 11/1812; B60L 11/1814
See application file for complete search history.

(56) References Cited

U.S. PATENT DOCUMENTS

| 8,167,360 | B2 * | 5/2012 | Deng | ................... | B60N 2/4235 296/187.08 |
| 2013/0075173 | A1 * | 3/2013 | Kato | ........................ | B60K 1/04 180/68.5 |
| 2014/0021744 | A1 * | 1/2014 | Imamura | .............. | B62D 21/157 296/187.08 |

FOREIGN PATENT DOCUMENTS

| JP | 2006-306249 | 11/2006 |
| JP | 2013-201112 | 10/2013 |
| JP | WO2012086297 | 5/2014 |

(Continued)

OTHER PUBLICATIONS

"Office Action of Japan Counterpart Application," dated Apr. 17, 2018,with English translation thereof, p. 1-p. 6.

*Primary Examiner* — Bryan A Evans
(74) *Attorney, Agent, or Firm* — JCIPRNET

(57) ABSTRACT

Disclosed is a vehicle body lower structure which is capable of suppressing an increase in a vehicle weight, ensuring a degree of freedom of a layout of vehicle parts and also protecting an electric power converter. In the vehicle body lower structure, the electric power converter is provided between a first cross member and a second cross member. The electric power converter includes an electric power converter body, a first support portion and a second support portion. The electric power converter is disposed between the first cross member and the second cross member. The first support portion is provided at the electric power converter body and supported by the first cross member. The second support portion is provided at the electric power converter body and supported by the second cross member. The second support portion has a weak portion which is deformable by an impact load.

15 Claims, 9 Drawing Sheets

(51) Int. Cl.
*B62D 21/15* (2006.01)
*B62D 25/20* (2006.01)

(56) References Cited

FOREIGN PATENT DOCUMENTS

| | | |
|---|---|---|
| JP | 2015137001 | 7/2015 |
| JP | 2016-066558 | 4/2016 |

* cited by examiner

VEHICLE BODY LOWER STRUCTURE

CROSS-REFERENCE TO RELATED APPLICATION

This application claims the priority benefit of Japan application serial no. 2016-188247, filed on Sep. 27, 2016. The entirety of the above-mentioned patent application is hereby incorporated by reference herein and made a part of this specification.

BACKGROUND OF THE INVENTION

Field of the Invention

The present invention relates to a vehicle body lower structure.

Description of Related Art

A vehicle body lower structure in which a raised portion is provided on a floor panel below a passenger seat and an electric power converter is provided below the raised portion is known. Also, a side sill is disposed outside the electric power converter in a vehicle width direction, and the side sill extends in a forward and backward direction of a vehicle body. The electric power converter converts DC power of a battery into AC power and supplies the AC power to a motor for running (refer to, for example, Patent Document 1)

When an impact load is input to a side portion of a vehicle body lower structure from a side of the vehicle body, the electric power converter can be protected from the impact load by supporting the impact load with the side sill.

PRIOR ART DOCUMENT

Patent Documents

[Patent Document 1] Japanese Unexamined Patent Application Publication No. 2015-137001

SUMMARY OF THE INVENTION

However, in order to support the impact load only with the side sill, it is necessary to secure a large cross-sectional area of the side sill. Therefore, a weight of a vehicle may be increased. Furthermore, a space below the floor panel may be reduced, and a layout of vehicle parts may be limited.

Therefore, an object of the present invention is to provide a vehicle body lower structure which is capable of suppressing an increase in a weight of a vehicle, securing a degree of freedom of a layout of vehicle parts and protecting an electric power converter.

To achieve the aforementioned objects, the invention disclosed in a first aspect provides a vehicle body lower structure (e.g., a vehicle body lower structure 10 of an embodiment) including a first cross member (e.g., a first cross member 14 of the embodiment) and a second cross member (e.g., a second cross member 15 of the embodiment) disposed with an interval in a forward and backward direction of a vehicle body, and an electric power converter (e.g., an electric power converter 2 of the embodiment) provided between the first cross member and the second cross member and below a floor panel (e.g., a floor panel 31 of the embodiment), wherein the electric power converter includes an electric power converter body (e.g., an electric power converter body 41 of the embodiment) disposed between the first cross member and the second cross member and below the floor panel, a first support portion (e.g., a first support portion 42 of the embodiment) provided at the electric power converter body and supported by the first cross member and a second support portion (e.g., a second support portion 46 of the embodiment) provided at the electric power converter body and supported by the second cross member, and one of the first support portion and the second support portion has a weak portion (e.g., a weak portion 88 of the embodiment).

As described above, one of the first support portion and the second support portion has the weak portion. Therefore, the weak portion can be deformed or broken by an impact load input from a side surface of a vehicle, and the electric power converter can be held by the other support portion. Therefore, the electric power converter can be relatively displaced with respect to the cross member on the weak portion side. Accordingly, the impact load is not concentrated on the electric power converter body, an influence of the impact load on the electric power converter body can be suppressed, and the electric power converter can be protected.

Therefore, unlike the prior art, it is not necessary to support the impact load with only a side sill and to protect the electric power converter. Thus, it is not necessary to excessively secure a cross-sectional area of the side sill, and thus an increase in a vehicle weight can be suppressed. Further, since it is not necessary to excessively secure the cross-sectional area of the side sill, a large space under the floor panel can be secured, and thus a degree of freedom of a layout of vehicle parts can be ensured.

Also, in a state in which the weak portion is deformed or broken, the electric power converter body can be held by the other support portion. Therefore, falling of the electric power converter body can be suppressed, and an excessive load can also be prevented from being applied to a wire harness. Thus, it is possible to protect the electric power converter and also to protect the wire harness.

In the invention disclosed in a second aspect, the weak portion may have a groove (e.g., an outer groove 85 and an inner groove 86 of the embodiment) on a side surface (e.g., an outer wall surface 75 and an inner wall surface 76 of the embodiment) of one of the first support portion and the second support portion in the vehicle width direction.

As described above, the weak portion is constituted with the groove. Therefore, a deformation or breakage state of the weak portion can be easily set by changing a shape or a size of the groove. Accordingly, the weak portion can be appropriately deformed or broken by the impact load input from the side surface of the vehicle.

In the invention disclosed in a third aspect, the electric power converter body may include a wall portion (e.g., a wall portion 54 of the embodiment) having the first support portion and the second support portion and configured to form an outer frame of the electric power converter body, a bottom portion (e.g., a bottom portion 55 of the embodiment) extending from a lower end of the wall portion to a center side of the electric power converter body, and a rib (e.g., ribs 57 and 58 of the embodiment) extending from an inner surface of the wall portion to an inner surface of the bottom portion.

As described above, the first support portion and the second support portion are provided at the wall portion of the electric power converter body. Further, the rib is provided at the wall portion in which the first support portion and the second support portion are provided. The rib extends from an inner surface of the wall portion to an inner surface of the bottom portion. Accordingly, the wall portion and the bottom portion are reinforced by the rib, and rigidity and strength of the outer fame of the electric power converter body can be ensured.

In the invention disclosed in a fourth aspect, the first support portion may include a first extending portion (e.g., a first extending portion 102 of the embodiment) extending from the electric power converter body and a first bracket (e.g., a first bracket 103 of the embodiment) installed on the first extending portion and also installed on the first cross member, and the second support portion may include a second extending portion (e.g., a second extending portion 72 of the embodiment) extending from the electric power converter body and a second bracket (e.g., a second bracket 73 of the embodiment) installed on the second extending portion and also installed on the second cross member.

Here, during normal travel of the vehicle, stress is concentrated in the vicinity of the first cross member and the first support portion. Also, the stress is concentrated in the vicinity of the second cross member and the second support portion. Therefore, each of the support portions is constituted with two members including the extending portion and the bracket, and the bracket is installed on the cross member. Thus, fatigue strength in the vicinity of an installation portion can be increased by forming the bracket with, for example, a member having high rigidity such as a steel material. Accordingly, during the normal travel of the vehicle, an installed state of the cross member and the bracket can be ensured.

Meanwhile, the weak portion can be easily formed at the extending portion by forming the extending portion by, for example, die-casting. Therefore, when the impact load is input, the extending portion can be appropriately deformed or broken, and the influence of the impact load on the electric power converter body can be suppressed, and thus the electric power converter body can be protected.

Further, during the normal travel of the vehicle, installation strength of the cross member and the bracket can be ensured. Accordingly, swinging of the electric power converter during the normal travel can be suppressed, and thus ride comfort performance can be enhanced.

In the invention disclosed in a fifth aspect, a battery (e.g., a battery 18 of the embodiment) provided at one of a front and a rear of the electric power converter in the vehicle body, and a wire harness (e.g., a wire harness 35 of the embodiment) configured to electrically connect the battery to the electric power converter and disposed between the battery and the electric power converter may be further included, and the weak portion may be disposed at one of the first support portion and the second support portion which is opposite to the wire harness.

As described above, the weak portion may be disposed at one of the first support portion and the second support portion which is opposite to the wire harness (i.e., the battery). Therefore, by deforming or breaking the support portion on an opposite side to the wire harness, the load can be prevented from being applied to the wire harness. Accordingly, by deforming or breaking the support portion, it is possible to protect the electric power converter and also to protect the wire harness.

According to the present invention, a weak portion can be deformed or broken by an impact load input from a side surface of a vehicle, and an electric power converter can be held by the other support portion. Therefore, concentration of the impact load on an electric power converter body can be suppressed, and thus the electric power converter can be protected. Accordingly, it is not necessary to excessively secure a cross-sectional area of a side sill, and an increase in a vehicle weight can be suppressed.

Further, since it is not necessary to excessively secure the cross-sectional area of the side sill, a large space below a floor panel can be secured, and a degree of freedom of a layout of vehicle parts can be ensured.

In addition, in a state in which the weak portion is deformed or broken by the impact load, the electric power converter body can be held by the other support portion. Therefore, falling of the electric power converter body can be suppressed, and application of the excessive load to a wire harness can be suppressed. Accordingly, the electric power converter body can be protected, and the wire harness can also be protected.

DESCRIPTION OF THE EMBODIMENTS

Figure 1:
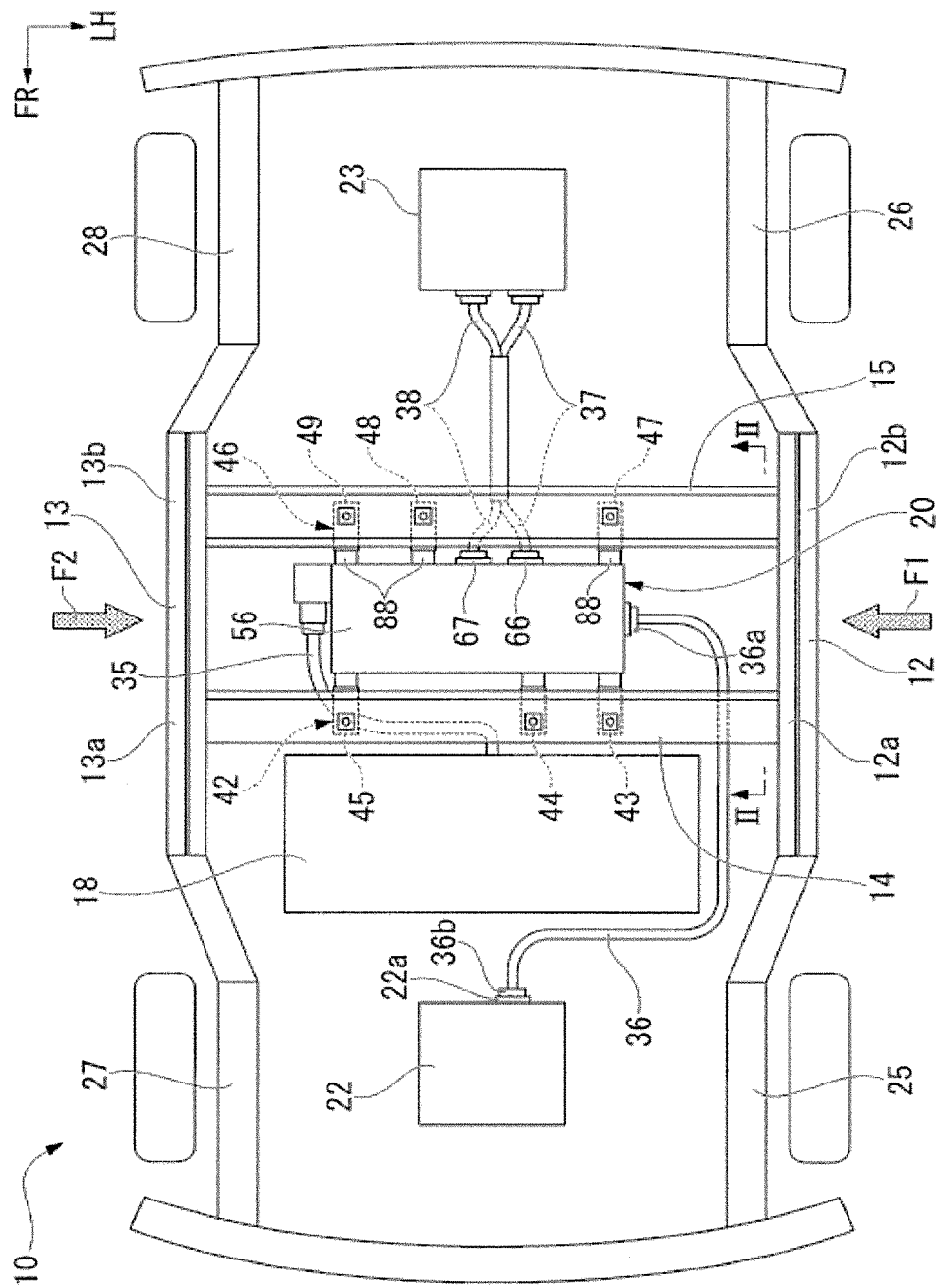
FIG. 1 is a plan view illustrating a vehicle body lower structure in one embodiment of the present invention.

Next, one embodiment of the present invention will be described with reference to the drawings. In the drawings, an arrow FR indicates a front of a vehicle, an arrow UP indicates an upper side of the vehicle, and an arrow LH indicates a left side of the vehicle.

As illustrated in FIG. 1, a vehicle body lower structure 10 constitutes a lower portion of a hybrid vehicle or an electric vehicle. The vehicle body lower structure 10 includes a left side sill 12, a right side sill 13, a first cross member 14, a second cross member 15, a battery 18, an electric power converter 20, a front motor 22 and a rear motor 23.

The left side sill 12 is interposed between a left front side frame 25 and a left rear frame 26. The right side sill 13 is interposed between a right front side frame 27 and a right rear frame 28.

The first cross member 14 is laid between a portion 12a near a front end of the left side sill 12 and a portion 13a near a front end of the right side sill 13. The second cross member, 15 is laid between a portion 12b near a rear end of the left side sill 12 and a portion 13b near a rear end of the right side sill 13.

The second cross member 15 is arranged further toward a rear side of a vehicle body than the first cross member 14. That is, the first cross member 14 and the second cross member 15 are disposed with an interval in a forward and backward direction of the vehicle body.

Figure 2:
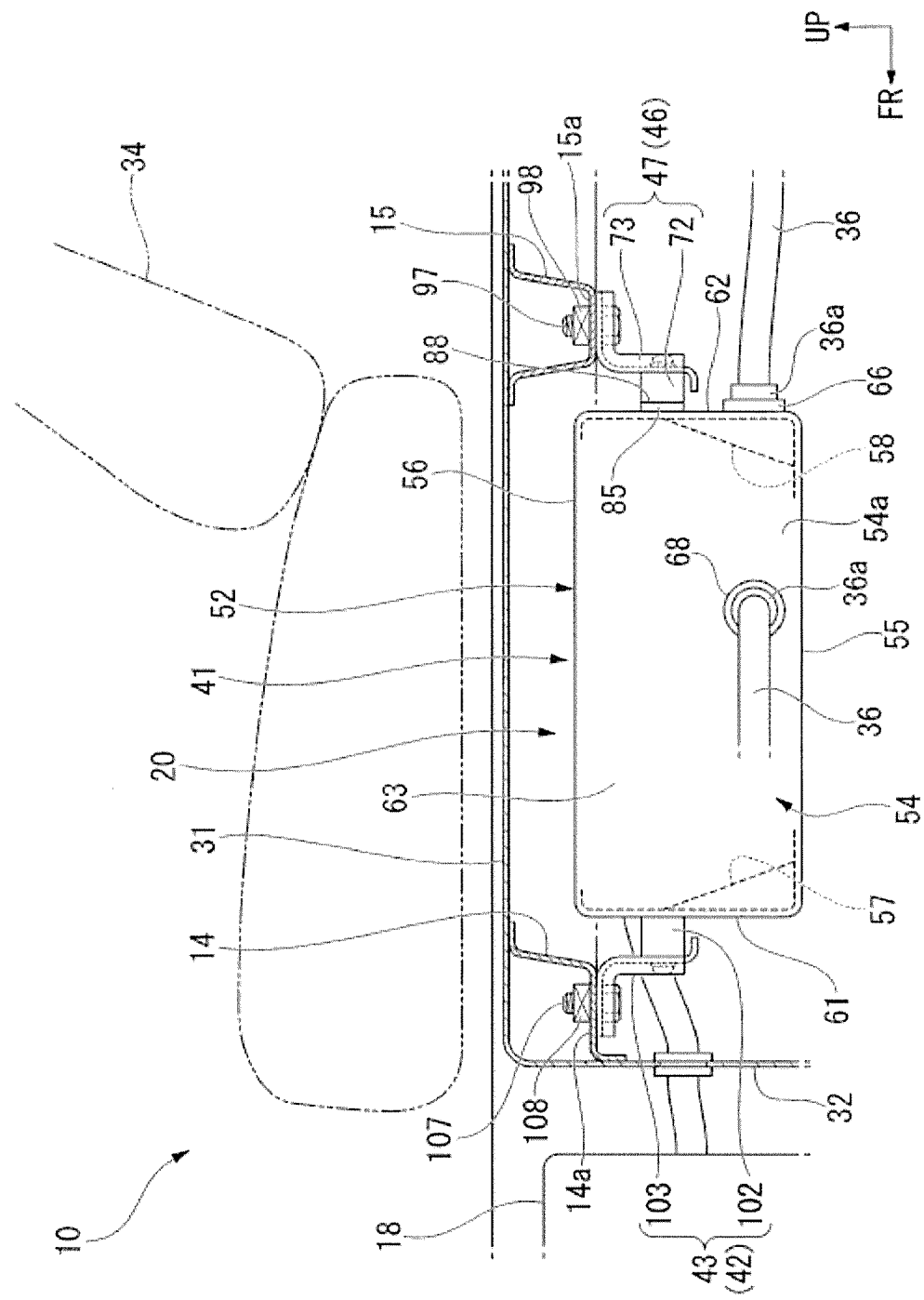
FIG. 2 is a cross-sectional view taken along line II-II of FIG. 1 and illustrating an electric power converter in one embodiment of the present invention.

As illustrated in FIG. 2, the first cross member 14 and the second cross member 15 are provided below a floor panel 31 to support the floor panel 31. In the floor panel 31, a concave portion 32 is formed at a front of the first cross member 14 in the vehicle body. A battery 18 is provided in the concave portion 32. The front motor 22 (refer to FIG. 1) is provided at a front of the battery 18 in the vehicle body.

Further, the electric power converter 20 is provided between the first cross member 14 and the second cross member 15 and below the floor panel 31. A seat 34 is installed on the floor panel 31 located above the electric power converter 20. That is, the electric power converter 20 is disposed below the seat 34.

The battery 18 is provided at a front of the electric power converter 20 in the vehicle body.

Figure 3:
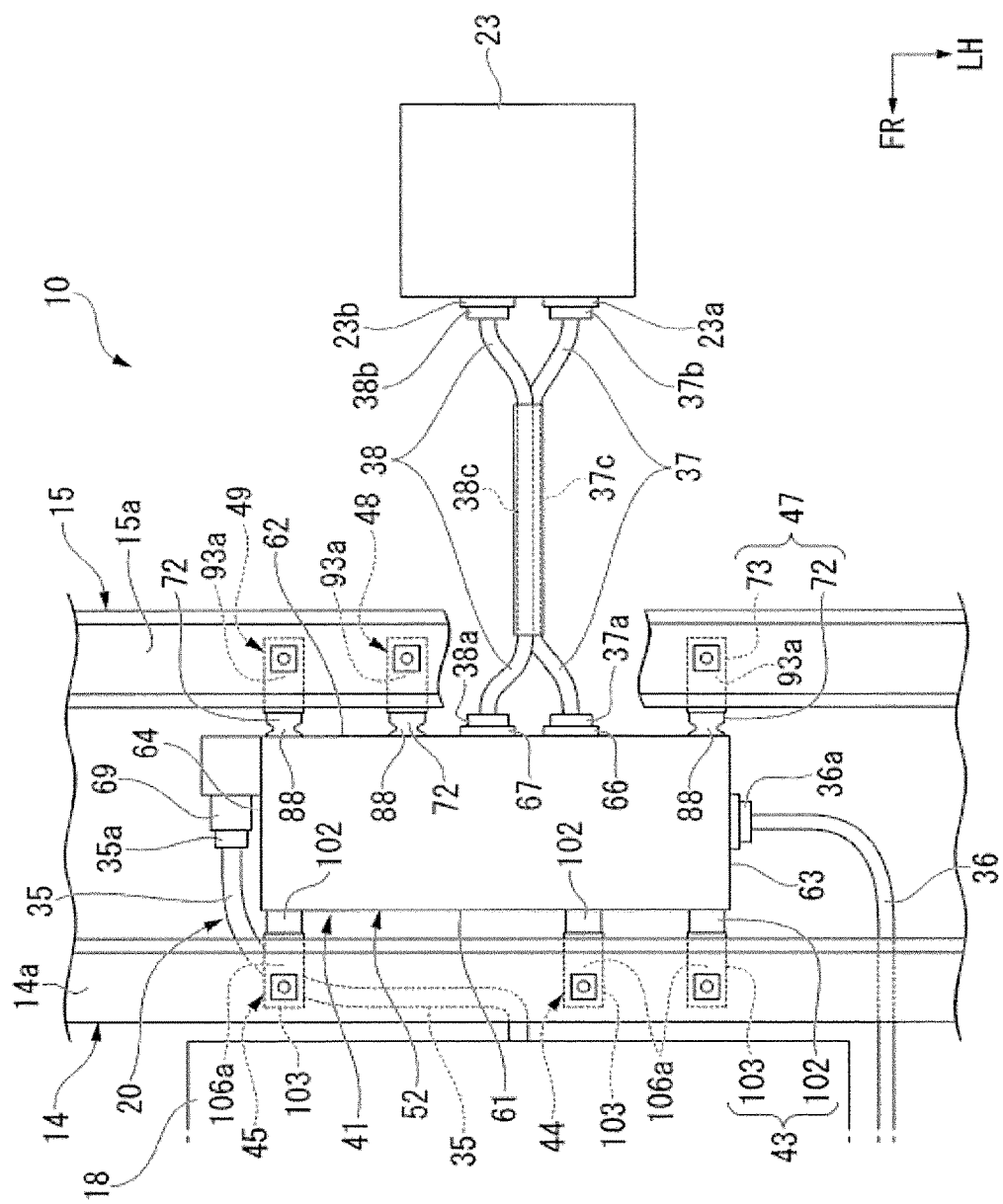
FIG. 3 is a plan view illustrating the electric power converter of FIG. 1 in one embodiment of the present invention.

As illustrated in FIG. 3, the rear motor 23 is provided at a rear of the electric power converter 20 in the vehicle body. The electric power converter 20 is electrically connected to the battery 18 by a wire harness 35. The wire harness 35 is disposed between the battery 18 and the electric power converter 20. The wire harness 35 is a DC cable.

Specifically, in the electric power converter 20, a connector 69 is provided on a right side wall 64 of an electric power converter body 41. One connecting part 35a of the wire harness 35 is connected to the connector 69. Further, the other connecting part of the wire harness 35 is connected to a connector of the battery 18.

Further, the electric power converter 20 is connected to the front motor 22 by a front wire harness 36. The front wire harness 36 is an AC cable.

Specifically, in the electric power converter 20, a connector 68 is provided on a left side wall 63 of the electric power converter body 41. One connecting part 36a of the front wire harness 36 is connected to the connector 68. Also, as illustrated in FIG. 1, the other connecting part 36b of the front wire harness 36 is connected to a connector 22a of the front motor 22.

Returning to FIG. 3, the electric power converter 20 is connected to the rear motor 23 by a first rear wire harness 37 and a second rear wire harness 38. Each of the first rear wire harness 37 and the second rear wire harness 38 is an AC cable.

Specifically, in the electric power converter 20, a first connector 66 and a second connector 67 are provided at a rear wall 62 of the electric power converter body 41. One connecting part 37a of the first rear wire harness 37 is connected to the first connector 66. Also, the other connecting part 37b of the first rear wire harness 37 is connected to a first connector 23a of the rear motor 23.

Further, one connecting part 38a of the second rear wire harness 38 is connected to the second connector 67 of the rear wall 62 of the electric power converter body 41. Also, the other connecting part 38b of the second rear wire harness 38 is connected to a second connector 23b of the rear motor 23.

Here, center portions 37c and 38c of the first rear wire harness 37 and the second rear wire harness 38 are bundled and installed on the vehicle body.

Figure 4:
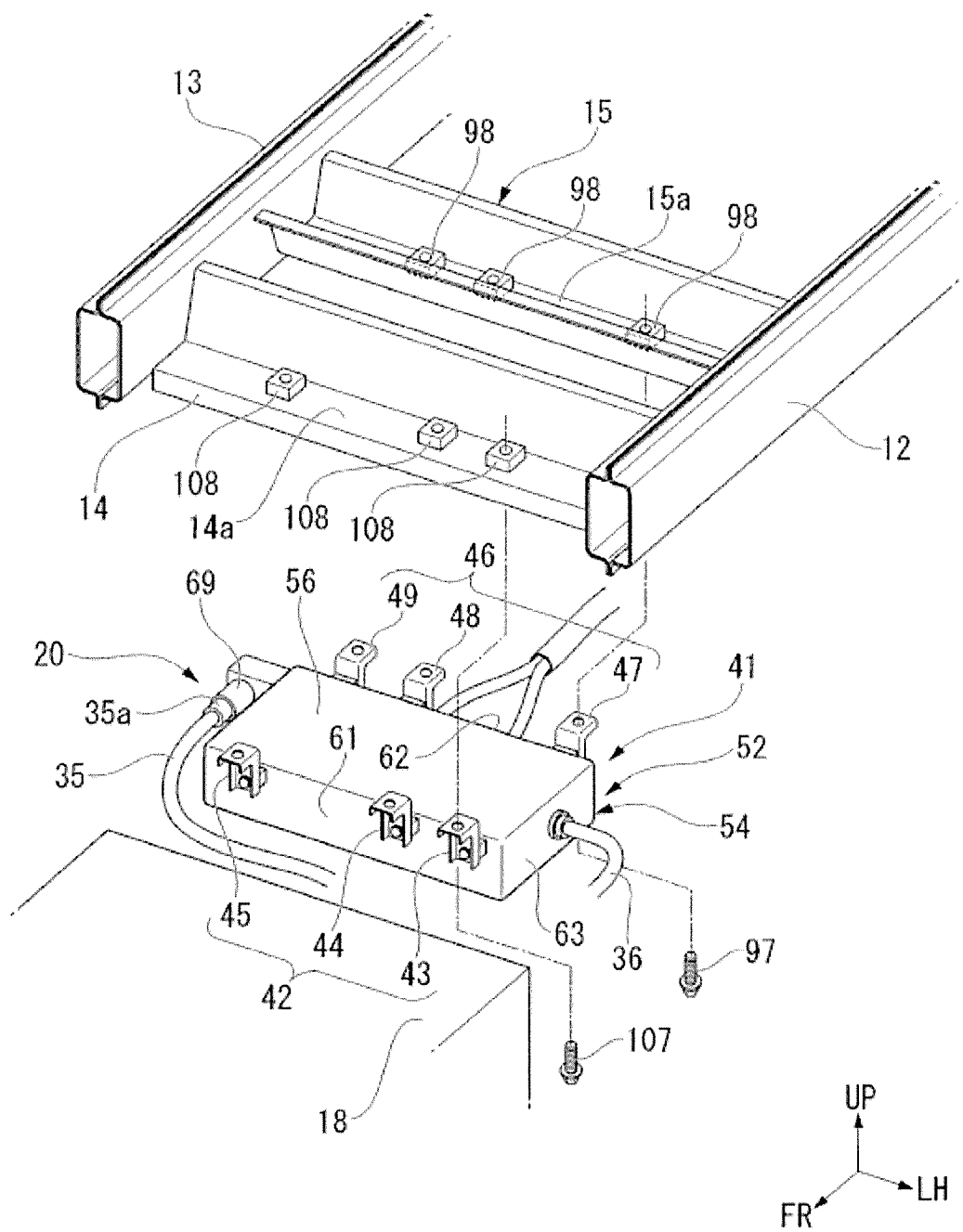
FIG. 4 is an exploded perspective view illustrating the vehicle body lower structure of FIG. 1 in one embodiment of the present invention.

As illustrated in FIGS. 2 and 4, the electric power converter 20 is a device which controls an output of the battery 18 to drive the front motor 22 and the rear motor 23 (refer to FIG. 1). The electric power converter 20 includes the electric power converter body 41, a first support portion 42 and a second support portion 46.

The electric power converter body 41 is disposed between the first cross member 14 and the second cross member 15 and below the floor panel 31. The electric power converter body 41 includes a rectangular housing 52, and a step-up converter, a step-down converter, an inverter and so on which are accommodated inside the housing 52, and the like. The step-up converter is a member which increases a voltage of the battery 18. The inverter is a member which converts a DC voltage supplied from the battery 18 into an AC voltage.

The housing 52 includes a wall portion 54, a bottom portion 55, a cover portion 56 and ribs 57 and 58. The wall portion 54 is formed in a rectangular frame body to form an outer frame of the electric power converter body 41. The bottom portion 55 protrudes from a lower end 54a of the wall portion 54 to a center side of the electric power converter body 41 to cover the lower end 54a of the wall portion 54.

The cover portion 56 is a member which covers the wall portion 54 of the rectangular frame from above.

The wall portion 54 has a front wall 61, a rear wall 62, a left side wall 63 and a right side wall 64 (refer to FIG. 3). The front wall 61 is disposed at a rear of the first cross member 14 in the vehicle body and is a wall which forms a front portion of the housing 52. The rear wall 62 is disposed at a front of the second cross member 15 in the vehicle body and is a wall which forms a rear portion of the housing 52. The first connector 66 and the second connector 67 are provided at the rear wall 62.

The left side wall 63 is disposed inside the left side sill 12 in a vehicle width direction. The connector 68 is provided at the left side wall 63. The right side wall 64 is disposed inside the right side sill 13 in the vehicle width direction. The connector 69 is provided at the right side wall 64.

Further, the cover portion 56 is disposed to face the floor panel 31 below the floor panel 31. Also, the bottom portion 55 is disposed below the cover portion 56.

The housing 52 is formed in a rectangular shape by the front wall 61, the rear wall 62, the left side wall 63, the right side wall 64, the cover portion 56 and the bottom portion 55.

Figure 5:
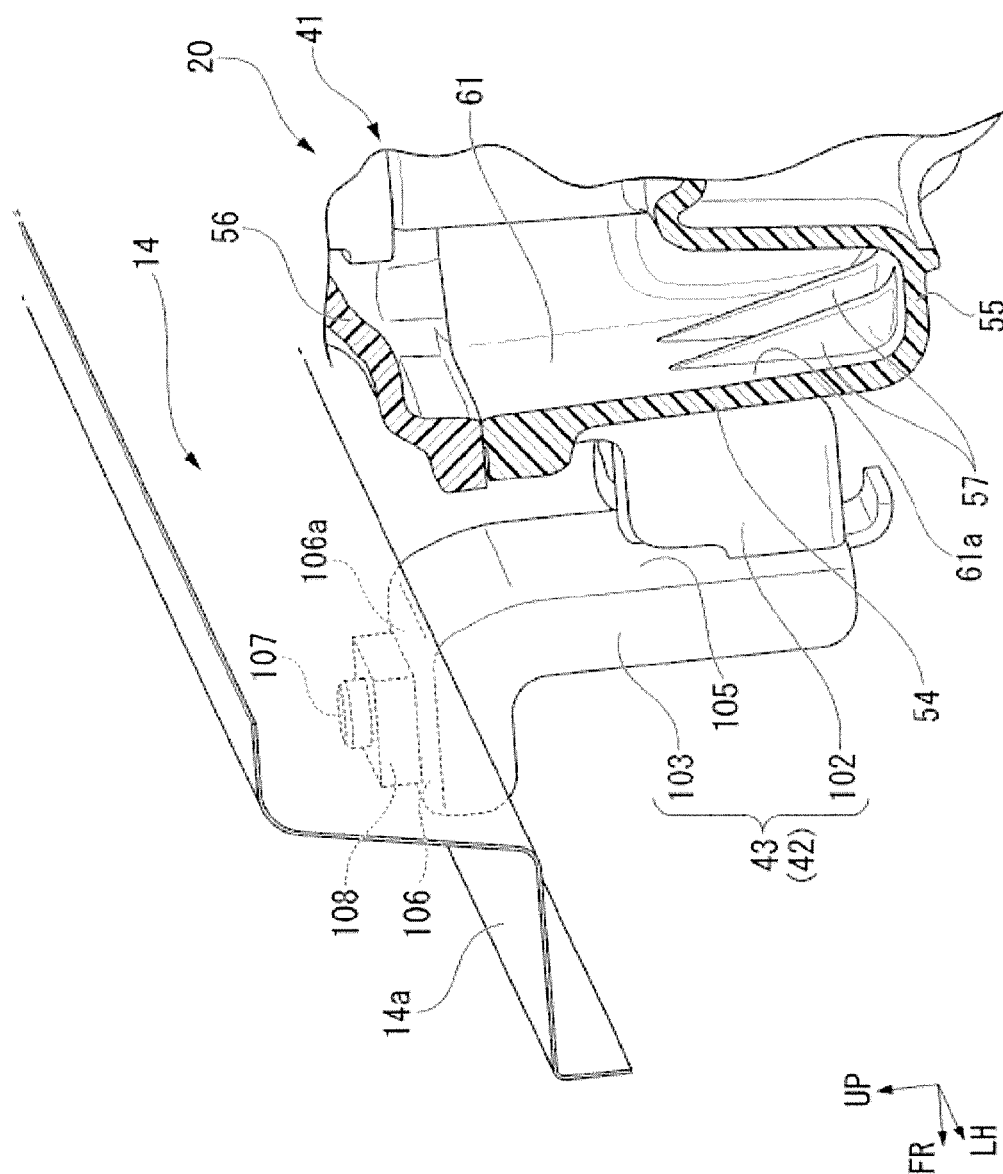
FIG. 5 is a perspective view illustrating a first support portion of the electric power converter of FIG. 1 in one embodiment of the present invention.

As illustrated in FIG. 5, a plurality of ribs 57 are provided at a portion 61a of the front wall 61 in which the first support portion 42 is provided. Each of the ribs 57 extends from an inner surface of the portion 61a of the front wall 61, in which the first support portion 42 is provided, to an inner surface of the bottom portion 55. Each of the ribs 57 has a triangular shape. The front wall 61 and the bottom portion 55 are reinforced by the ribs 57.

Further, as illustrated in FIG. 2, like the front wall 61, a plurality of ribs 58 are formed at a portion of the rear wall 62 in which the second support portion 46 is provided. The rear wall 62 and the bottom portion 55 are reinforced by the ribs 58.

Accordingly, rigidity and strength of the wall portion 54 of the electric power converter body 41 are ensured.

Returning to FIG. 4, the first support portion 42 is provided on the front wall 61 of the housing 52 and is supported by the first cross member 14. The first support portion 42 includes a left first support portion 43, a central first support portion 44 and a right first support portion 45. The left first support portion 43, the central first support portion 44 and the right first support portion 45 are similar parts. Each of elements of the central first support portion 44 and the right first support portion 45 is designated by the same reference numeral as that of the left first support portion 43, and a detailed description thereof will be omitted below.

The second support portion 46 is provided on the rear wall 62 of the housing 52 and is supported by the second cross member 15. The second support portion 46 includes a left second support portion 47, a central second support portion 48 and a right second support portion 49. The left second support portion 47, the central second support portion 48 and the right second support portion 49 are similar parts. Each of elements of the central second support portion 48 and the right second support portion 49 is designated by the same reference numeral as that of the left second support portion 47, and a detailed description thereof will be omitted below.

Figure 6:
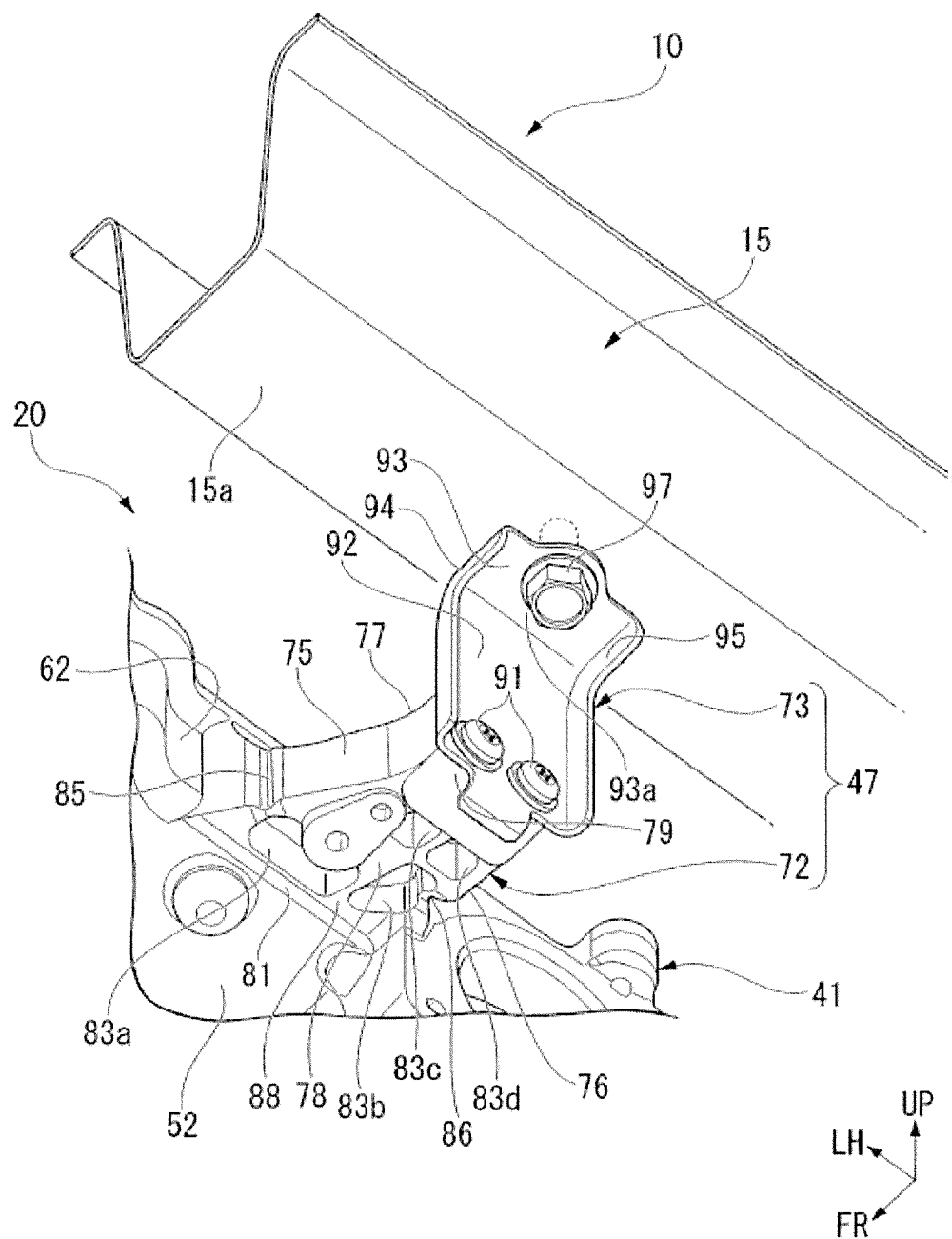
FIG. 6 is a perspective view illustrating a second support portion of the electric power converter of FIG. 1 in one embodiment of the present invention.
Figure 7:
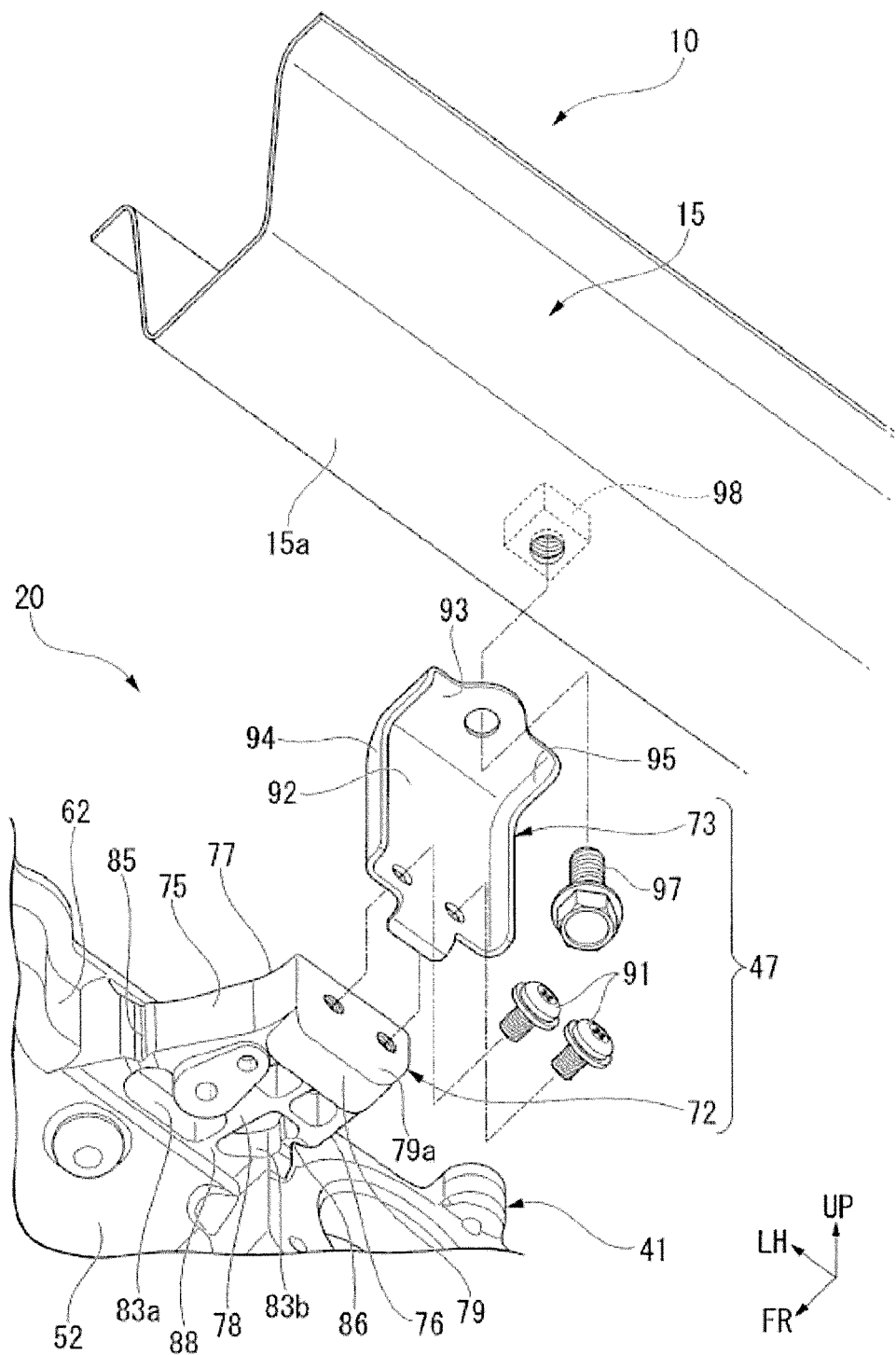
FIG. 7 is an exploded perspective view illustrating the second support portion of FIG. 6 in one embodiment of the present invention.

As illustrated in FIGS. 6 and 7, the left second support portion 47 includes a second extending portion 72 which extends from the rear wall 62 of the housing 52 and a second bracket 73 which is installed on the second extending portion 72.

The second extending portion 72 is integrally formed with the rear wall 62 by die-casting. The second extending portion 72 includes an outer wall surface 75 which is provided on an outer side in the vehicle width direction, an inner wall surface 76 which is provided on an inner side in the vehicle width direction, an upper surface 77 which connects an upper end of the outer wall surface 75 and an upper end of the inner wall surface 76, a lower surface 78 which connects a lower end of the outer wall surface 75 and a lower end of the inner wall surface 76 and a tip end surface 79a which is formed to be flat on a tip end 79.

The outer wall surface 75 is a side surface in the vehicle width direction which is formed on an outer side in the vehicle width direction. Further, the inner wall surface 76 is a side surface in the vehicle width direction which is formed on an inner side in the vehicle width direction. The second extending portion 72 is formed to have a rectangular cross section of the outer wall surface 75, the inner wall surface 76, the upper surface 77 and the lower surface 78.

The second extending portion 72 is formed in a trapezoidal shape in a plan view so that a width dimension between the outer wall surface 75 and the inner wall surface 76 becomes smaller from a base portion 81 toward the tip end 79. A plurality of concave portions 83a to 83d are formed on the lower surface 78. By forming the plurality of concave portions 83a to 83d in the second extending portion 72, a weight of the second extending portion 72 can be reduced.

Among the plurality of concave portions 83a to 83d, a first concave portion 83a and a second concave portion 83b are formed along the base portion 81. Among the plurality of concave portions 83a to 83d, a third concave portion 83c and a fourth concave portion 83d are formed in a portion close to the tip end 79.

Further, the second extending portion 72 has an outer groove 85 which is formed on the outer wall surface 75 and an inner groove 86 which formed on the inner wall surface 76. The outer groove 85 is formed to be recessed inward in the vehicle width direction on the outer wall surface 75 of the base portion 81 and extends vertically.

The inner groove 86 is formed to be recessed outward in the vehicle width direction on the inner wall surface 76 of the base portion 81 and extends vertically.

Since the outer groove 85 and the inner groove 86 are formed in the base portion 81, a weak portion 88 is formed in the base portion 81 by the outer groove 85 and the inner groove 86. In other words, the weak portion 88 is a low-strength portion having the outer groove 85 and the inner groove 86.

Further, the first concave portion 83a and the second concave portion 83b are formed between the outer groove 85 and the inner groove 86. The weak portion 88 has strength and rigidity which supports the electric power converter body 41 during normal travel.

Meanwhile, the weak portion 88 is formed to be deformable and breakable by an impact load F1 when the impact load F1 (refer to FIG. 1) is input to the left side sill 12 from a left side of the vehicle body lower structure 10. In the same manner, the weak portion 88 is formed to be deformable or breakable by an impact load F2 when the impact load F2 (refer to FIG. 1) is input to the right side sill 13 from a right side of the vehicle body lower structure 10.

As described above, since the weak portion 88 is formed with the outer groove 85 and the inner groove 86, a deformation and breakage state of the weak portion 88 can be easily set by changing shapes or sizes of the outer groove 85 and the inner groove 86. Therefore, the weak portion 88 can be appropriately deformed or broken by the impact loads F1 and F2 input from the sides of the vehicle body lower structure 10.

Similarly to the left second support portion 47, the weak portion 88 (not illustrated) is also formed in each of the central second support portion 48 and the second extending portion 72 of the right second support portion 49 illustrated in FIG. 3.

Returning to FIGS. 6 and 7, in the left second support portion 47, the second bracket 73 is installed on the tip end surface 79a of the second extending portion 72 by a plurality of bolts 91. The second bracket 73 is formed to have an L shape in a side view by press-molding a steel plate. The second bracket 73 has a vertical portion 92, a horizontal portion 93, an outer rib 94 and an inner rib 95.

A lower end of the vertical portion 92 is installed on the tip end surface 79a of the second extending portion 72 by the bolt 91. The horizontal portion 93 is bent from an upper end of the vertical portion 92 toward a rear of the vehicle body and installed on a bottom portion 15a of the second cross member 15 by a bolt 97 and a nut 98.

The outer rib 94 is formed to have an L shape along outer sides of the vertical portion 92 and the horizontal portion 93. The inner rib 95 is formed to have an L shape along inner sides of the vertical portion 92 and the horizontal portion 93. Therefore, the vertical portion 92 and the horizontal portion 93 are reinforced by the outer rib 94 and the inner rib 95, and the strength and rigidity of the second bracket 73 are secured.

A lower end of the second bracket 73 is installed on the tip end surface 79a of the second extending portion 72 by the bolt 91, and the horizontal portion 93 is installed on the bottom portion 15a of the second cross member 15 by the bolt 97 and the nut 98. Accordingly, the left second support portion 47 is installed on the bottom portion 15a of the second cross member 15.

As illustrated in FIGS. 3 and 5, the central second support portion 48 and the right second support portion 49 are installed on the bottom portion 15a of the second cross member 15 similarly to the left second support portion 47. Therefore, the rear wall 62 of the housing 52 is installed on the bottom portion 15a of the second cross member 15 via the left second support portion 47 to the right second support portion 49.

The left first support portion 43 includes a first extending portion 102 which extends from the front wall 61 of the housing 52 and a first bracket 103 which is installed on the first extending portion 102.

The first extending portion 102 is a portion obtained by removing the outer groove 85 and the inner groove 86 from the second extending portion 72, and other constitutions thereof are the same as those of the second extending portion 72. That is, the first extending portion 102 is a member which does not include the weak portion 88 of the second extending portion 72.

Therefore, the first extending portion 102 has strength and rigidity which support the electric power converter body 41 during the normal travel. Further, when the impact load F1 (refer to FIG. 1) is input to the left side sill 12 from the left side of the vehicle body lower structure 10, the first extending portion 102 can suppress deformation and breakage due to the impact load F1. Similarly, when the impact load F2 (refer to FIG. 1) is input to the right side sill 13 from the right side of the vehicle body lower structure 10, the first extending portion 102 can suppress the deformation and breakage due to the impact load F2.

The first bracket 103 of the left first support portion 43 is formed similarly to the second bracket 73 of the left second support portion 47. That is, the lower end of the vertical portion 105 of the first bracket 103 is installed on the tip end surface of the first extending portion 102 by a bolt. Further, the horizontal portion 106 of the first bracket 103 is installed on a bottom portion 14a of the first cross member 14 by a bolt 107 and a nut 108.

Accordingly, the left first support portion 43 is installed on the bottom portion 14a of the first cross member 14. In the same manner, the central first support portion 44 and the right first support portion 45 are installed on the bottom portion 14a of the first cross member 14.

Therefore, the front wall 61 of the housing 52 is installed on the bottom portion 14a of the first cross member 14 via the left first support portion 43 to the right first support portion 45.

As described above, the electric power converter body 41 is installed on the bottom portion 15a of the second cross member 15 via the left second support portion 47 to the right second support portion 49 and also installed on the bottom portion 14a of the first cross member 14 via the left first support portion 43 to the right first support portion 45. That is, the electric power converter 20 is supported by the first cross member 14 and the second cross member 15.

Further, the rib 57 is provided at the portion 61a of the front wall 61 in which the left first support portion 43 to the right first support portion 45 are provided. Also, the rib 58 (refer to FIG. 2) is provided at the portion of the rear wall 62 in which the left second support portion 47 to the right second support portion 49 are provided.

Therefore, the rigidity and strength of the wall portion 54 of the electric power converter body 41 are ensured by the rib 57 and the rib 58. Accordingly, the electric power converter body 41 is firmly installed on the bottom portion 15a of the second cross member 15 via the left second support portion 47 to the right second support portion 49 and firmly installed on the bottom portion 14a of the first cross member 14 via the left first support portion 43 to the right first support portion 45.

Here, in the left first support portion 43, stress is concentrated in the vicinity of an installation portion 106a between the first cross member 14 and the horizontal portion 106 of the first bracket 103 during the normal travel of a vehicle. Therefore, the left first support portion 43 is constituted with two members including the first extending portion 102 and the first bracket 103, and the first bracket 103 is installed on the first cross member 14.

Therefore, by forming the first bracket 103 with, for example, a member having high rigidity such as a steel material, fatigue strength in the vicinity of the installation portion 106a of the left first support portion 43 can be increased.

In the same manner, the fatigue strength in the vicinity of the installation portion 106a of the central first support portion 44 and the right first support portion 45 can be increased.

As illustrated in FIGS. 3 and 6, in the left second support portion 47, the stress is concentrated in the vicinity of an installation portion 93a between the second cross member 15 and the horizontal portion 93 of the second bracket 73 during the normal travel of the vehicle. Therefore, the left second support portion 47 is constituted with two members including the second extending portion 72 and the second bracket 73, and the second bracket 73 is installed on the second cross member 15.

Therefore, by forming the second bracket 73 with a member having high rigidity such as the steel material, like the first bracket 103, the fatigue strength in the vicinity of the installation portion 93a of the left second support portion 47 can be increased.

In the same manner, the fatigue strength in the vicinity of the installation portion 93a of the central second support portion 48 and the right second support portion 49 can be increased.

Accordingly, during the normal travel of the vehicle, an installed state between the first cross member 14 and the first bracket 103 can be ensured, and the installed state between the second cross member 15 and the second bracket 73 can be ensured.

Further, during the normal travel of the vehicle, installation rigidity between the first cross member 14 and the first bracket 103 can be ensured, and the installation rigidity of the second cross member 15 and the second bracket 73 can be secured. As a result, swinging of the electric power converter 20 during the normal travel can be suppressed, and thus ride comfort performance can be enhanced.

Meanwhile, by forming the first extending portion 102 and the second extending portion 72 by, for example, the die casting, the outer groove 85 and the inner groove 86 can be easily formed in the second extending portion 72. That is, the weak portion 88 can be easily formed in the second extending portion 72. Accordingly, the weak portion 88 can be appropriately deformed or broken by the impact load when the impact load is input from the left side or the right side of the vehicle body lower structure 10.

Here, the weak portion 88 is not provided at the left first support portion 43 to the right first support portion 45. Therefore, only the weak portions 88 in the left second support portion 47 to the right second support portion 49 can be deformed or broken by the impact load input from the left side or the right side of the vehicle body lower structure 10.

In a state in which the weak portion 88 is deformed or broken, the electric power converter body 41 can be held by the left first support portion 43 to the right first support portion 45.

Accordingly, falling of the electric power converter body 41 can be suppressed by the left first support portion 43 to the right first support portion 45, and application of an excessive load to the wire harness 35 can also be suppressed.

Further, by deforming or breaking only the weak portions 88 in the left second support portion 47 to the right second support portion 49, the electric power converter body 41 can be relatively displaced with respect to the second cross member 15 on the weak portion 88 side in the vehicle width direction.

Therefore, it is possible to suppress concentration of the impact load on the electric power converter body 41. Accordingly, an influence of the impact load on the electric power converter body 41 can be suppressed, and the electric power converter body 41 can be protected.

Therefore, unlike the prior art, it is not necessary to support the impact load with only the left side sill 12 and the right side sill 13 and to protect the electric power converter 20. Therefore, it is not necessary to excessively secure a cross-sectional area of each of the left side sill 12 and the right side sill 13, and thus an increase in a vehicle weight can be suppressed.

Further, since it is not necessary to excessively secure the cross-sectional area of the left side sill 12 and the right side sill 13, a large space under the floor panel 31 can be secured, and thus a degree of freedom of a layout of vehicle parts can be ensured.

Further, in a state in which the weak portion 88 in the left second support portion 47 to the right second support portion 49 is broken, the electric power converter body 41 can be held by the left first support portion 43 to the right first support portion 45. Therefore, the falling of the electric power converter body 41 can be suppressed, and the application of the excessive load to the wire harness 35 can also be suppressed. Accordingly, the electric power converter body 41 can be protected, and the wire harness 35 can also be protected.

Further, each of the weak portions 88 in the left second support portion 47 to the right second support portion 49 is provided on an opposite side of the wire harness 35 (i.e., the battery 18). In other words, each of the weak portions 88 is provided at the left second support portion 47 to the right second support portion 49 opposite to the wire harness 35 (i.e., the battery 18).

Therefore, each of the weak portions 88 in the left second support portion 47 to the right second support portion 49 on the opposite side of the wire harness 35 can be deformed or broken. Thus, it is possible to suppress the impact load from acting on the wire harness 35, to protect the electric power converter body 41 and to protect the wire harness 35.

Figure 8:
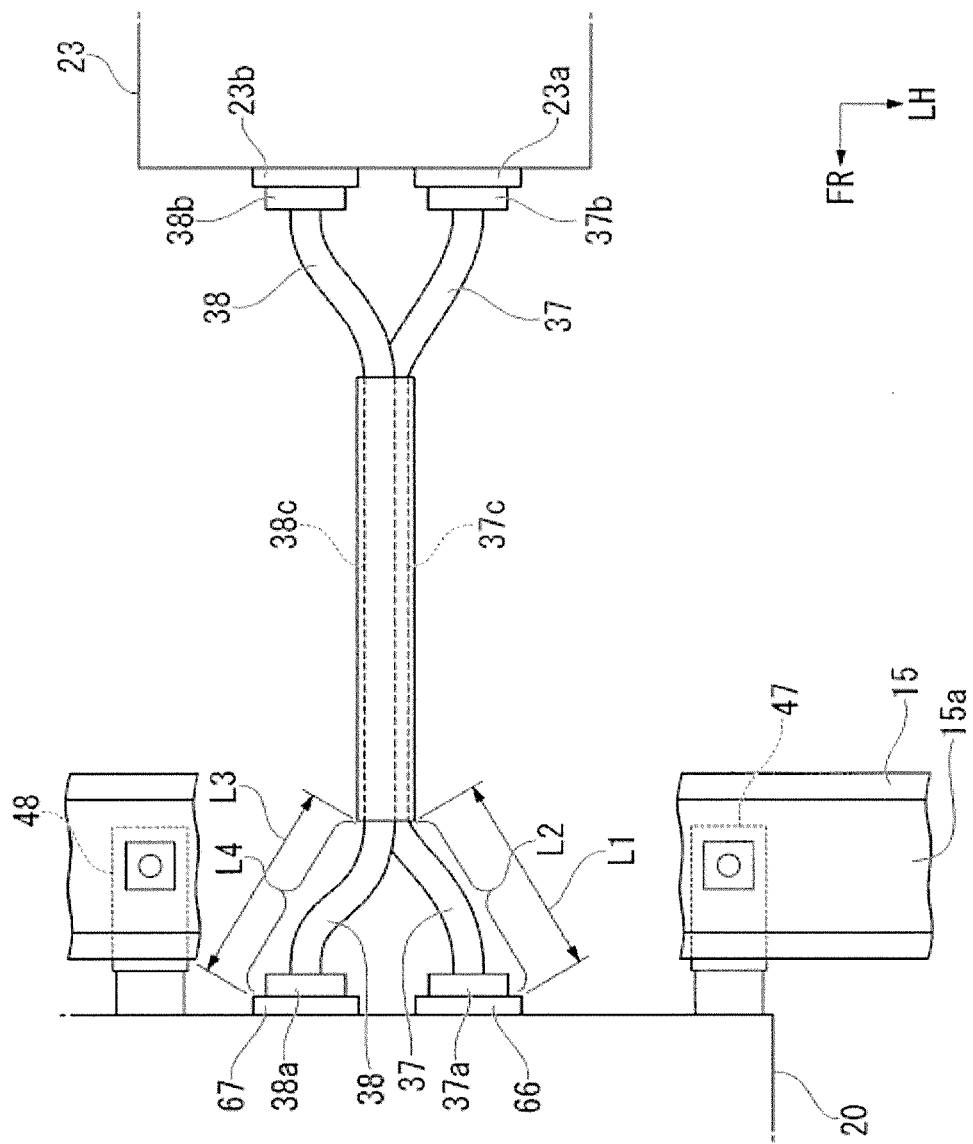
FIG. 8 is a bottom view illustrating a first rear wire harness and a second rear wire harness of FIG. 3 in one embodiment of the present invention.

As illustrated in FIG. 8, each of the center portions 37c and 38c of the first rear wire harness 37 and the second rear wire harness 38 is installed on the vehicle body lower structure 10. Also, a distance from the center portion 37c of the first rear wire harness 37 to the first connector 66 is set to a distance L1. In addition, a length dimension of the first rear wire harness 37 from the center portion 37c to the first connector 66 is set to a length L2.

Further, the length L2 is set to be larger than the distance L1. That is, the first rear wire harness 37 is disposed with a clearance between the center portion 37c and the first connector 66.

In the same manner, a distance from the center portion 38c of the second rear wire harness 38 to the second connector 67 is set to a distance L3. Also, a length dimension of the second rear wire harness 38 from the center portion 38c to the second connector 67 is set to a length L2.

Further, the length L4 is set to be larger than the distance L3. That is, the second rear wire harness 38 is disposed with a clearance between the center portion 38c and the second connector 67.

Therefore, when each of the weak portions 88 in the left second support portion 47 to the right second support portion 49 illustrated in FIG. 3 is deformed or broken, it is possible to cause the first rear wire harness 37 and the second rear wire harness 38 to follow movement of the electric power converter body 41.

Next, an example in which the damage to the first rear wire harness 37 and the second rear wire harness 38 is suppressed when the impact load is input to the left side sill 12 and the right side sill 13 from the sides of the vehicle body lower structure 10 will be described with reference to FIGS. 1, 9 and 10.

First, a case in which the impact load F1 is input to the left side sill 12 from the left side of the vehicle body lower structure 10 will be described with reference to FIGS. 1 and 9.

Figure 9:
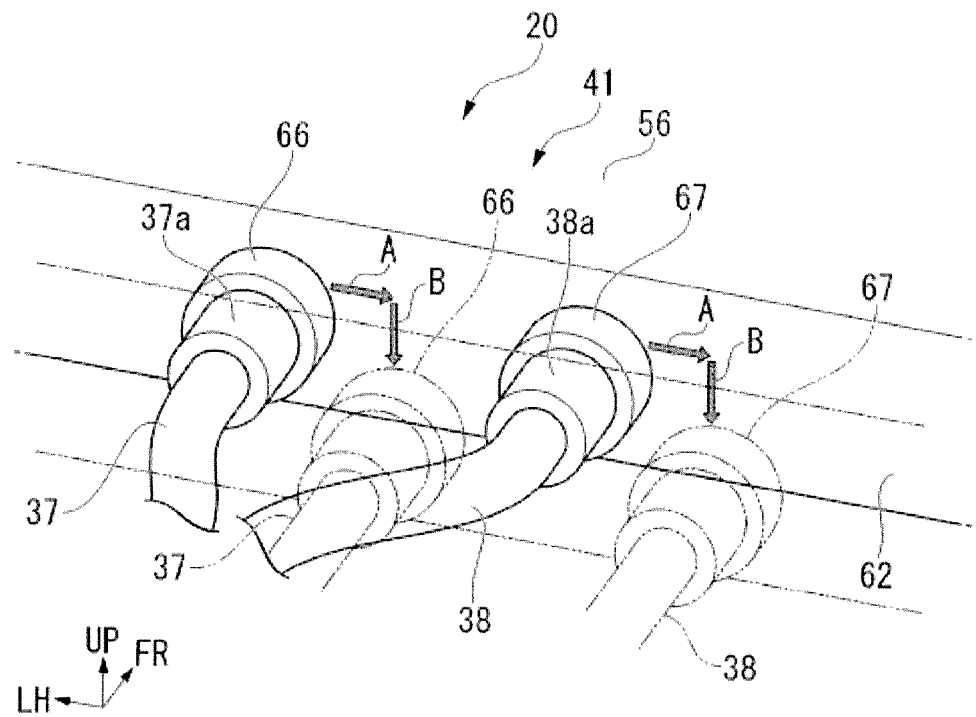
FIG. 9 is a perspective view illustrating an example in which damage to the first rear wire harness and the second rear wire harness is suppressed when an impact load is input to a left side sill in one embodiment of the present invention.

As illustrated in FIGS. 1 and 9, when the impact load F1 is input to the left side sill 12 from the left side of the vehicle body lower structure 10, each of the weak portions 88 in the left second support portion 47 to the right second support portion 49 is deformed or broken by the impact load F1. Therefore, the first connector 66 and the second connector 67 move toward a right side in the vehicle width direction as indicated by an arrow A and also move downward as indicated by an arrow B.

Here, the first rear wire harness 37 is disposed with a clearance between the center portion 37c (refer to FIG. 8) and the first connector 66. Also, the second rear wire harness 38 is disposed with a clearance between the center portion 38c (refer to FIG. 8) and the second connector 67.

Therefore, it is possible to cause the first rear wire harness 37 and the second rear wire harness 38 to follow movement of the first connector 66 and the second connector 67. Accordingly, the damage to the first rear wire harness 37 and the second rear wire harness 38 can be suppressed.

Next, a case in which the impact load F2 is input to the right side sill 13 from the right side of the vehicle body lower structure 10 will be described with reference to FIGS. 1 and 10.

Figure 10:
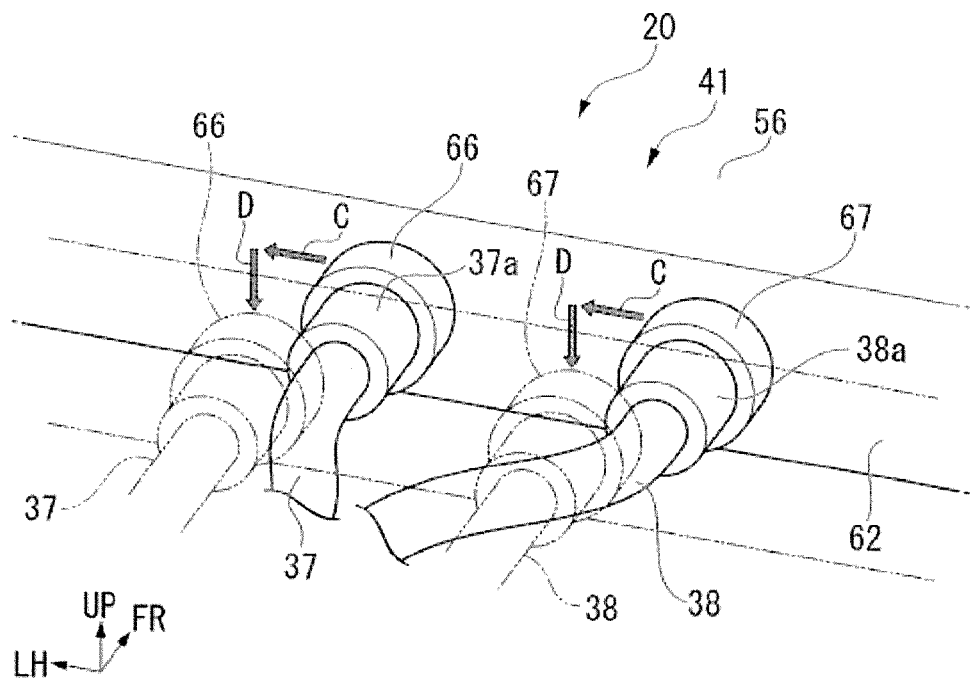
FIG. 10 is a perspective view illustrating an example in which damage to the first rear wire harness and the second rear wire harness is suppressed when the impact load is input to a right side sill in one embodiment of the present invention.

As illustrated in FIGS. 1 and 10, when the impact load F2 is input to the right side sill 13 from the right side of the vehicle body lower structure 10, each of the weak portions 88 in the left second support portion 47 to the right second support portion 49 is deformed by the impact load F2. Therefore, the first connector 66 and the second connector 67 move toward a left side in the vehicle width direction as indicated by an arrow C and also move downward as indicated by an arrow D.

Here, the first rear wire harness 37 is disposed with a clearance between the center portion 37c (refer to FIG. 8) and the first connector 66. Also, the second rear wire harness 38 is disposed with a clearance between the center portion 38c (refer to FIG. 8) and the second connector 67.

Therefore, it is possible to cause the first rear wire harness 37 and the second rear wire harness 38 to follow movement of the first connector 66 and the second connector 67. Accordingly, the damage to the first rear wire harness 37 and the second rear wire harness 38 can be suppressed.

In addition, the technical scope of the present invention is not limited to the above-described embodiment, and various modifications can be made without departing from the spirit of the present invention.

For example, in the above-described embodiment, each of the weak portions 88 is formed in the second extending portion 72 of the left second support portion 47 to the right second support portion 49 provided on a rear side of the vehicle body, but the present invention is not limited thereto.

For example, each of the weak portions 88 may be formed in the first extending portions 102 of the left first support portion 43 to the right first support portion 45 provided on a front side of the vehicle body. In this case, it is preferable to provide the battery 18 on the rear side of the electric power converter 20 in the vehicle body.

Further, in the above-described embodiment, the weak portion 88 is formed in the base portion 81 of the second extending portion 72 by the outer groove 85 or the inner groove 86, but the present invention is not limited thereto. For example, the weak portion may be formed by forming a hole in the base portion 81 of the second extending portion 72 or changing a thickness thereof.

Furthermore, in the case in which the second extending portion 72 is formed of a steel material, the weak portion may be formed by, for example, annealing with a laser.

Also, in the above-described embodiment, the example in which the battery 18 is provided on the front side of the electric power converter 20 in the vehicle body has been described. However, the present invention is not limited thereto, and the battery 18 may be provided on the rear side of the electric power converter 20 in the vehicle body.

Further, in the above-described embodiment, the example in which the outer groove 85 is formed on the outer wall surface 75 and the inner groove 86 is formed on the inner wall surface 76 has been described, but the present invention is not limited to this. For example, the outer groove 85 may be formed on only the outer wall surface 75, and the inner groove 86 may also be formed on only the inner wall surface 76.

Further, in the above-described embodiment, the example in which the electric power converter 20 is provided below the seat 34 has been described, but the present invention is not limited thereto, and the electric power converter 20 may be provided at a place other than below the seat 34.

What is claimed is:

1. A vehicle body lower structure comprising:
    a first cross member and a second cross member disposed with an interval in a forward and backward direction of a vehicle body, and
    an electric power converter provided between the first cross member and the second cross member and below a floor panel,
    wherein the electric power converter comprises an electric power converter body disposed between the first cross member and the second cross member and below the floor panel, a first support portion provided at the electric power converter body and supported by the first cross member, and a second support portion provided at the electric power converter body and supported by the second cross member, and
    one of the first support portion and the second support portion has a weak portion,
    wherein the weak portion has a groove on a side surface of one of the first support portion and the second support portion in a vehicle width direction perpendicular to the forward and backward direction,
    wherein in the vehicle width direction, a width of the weak portion is smaller than a width of other portions of the one of the first support portion and the second support portion.

2. The vehicle body lower structure according to claim 1, wherein the electric power converter body comprises a wall portion having the first support portion and the second support portion and configured to form an outer frame of the electric power converter body, a bottom portion extending from a lower end of the wall portion to a center side of the electric power converter body, and a rib extending from an inner surface of the wall portion to an inner surface of the bottom portion.

3. The vehicle body lower structure according to claim 1, wherein the first support portion comprises a first extending portion extending from the electric power converter body and a first bracket installed on the first extending portion and also installed on the first cross member, and
    the second support portion comprises a second extending portion extending from the electric power converter body and a second bracket installed on the second extending portion and also installed on the second cross member.

4. The vehicle body lower structure according to claim 1, further comprising a battery provided at one of a front and a rear of the electric power converter in the vehicle body, and a wire harness configured to electrically connect the battery to the electric power converter and disposed between the battery and the electric power converter,
    wherein the weak portion is disposed at one of the first support portion and the second support portion which is opposite to the wire harness.

5. The vehicle body lower structure according to claim 1, wherein the electric power converter body comprises a wall portion having the first support portion and the second support portion and configured to form an outer frame of the electric power converter body, a bottom portion extending from a lower end of the wall portion to a center side of the electric power converter body, and a rib extending from an inner surface of the wall portion to an inner surface of the bottom portion.

6. The vehicle body lower structure according to claim 1, wherein the first support portion comprises a first extending portion extending from the electric power converter body and a first bracket installed on the first extending portion and also installed on the first cross member, and
    the second support portion comprises a second extending portion extending from the electric power converter body and a second bracket installed on the second extending portion and also installed on the second cross member.

7. The vehicle body lower structure according to claim 2, wherein the first support portion comprises a first extending portion extending from the electric power converter body and a first bracket installed on the first extending portion and also installed on the first cross member, and
    the second support portion comprises a second extending portion extending from the electric power converter body and a second bracket installed on the second extending portion and also installed on the second cross member.

8. The vehicle body lower structure according to claim 5, wherein the first support portion comprises a first extending portion extending from the electric power converter body and a first bracket installed on the first extending portion and also installed on the first cross member, and
    the second support portion comprises a second extending portion extending from the electric power converter body and a second bracket installed on the second extending portion and also installed on the second cross member.

9. The vehicle body lower structure according to claim 1, further comprising a battery provided at one of a front and a rear of the electric power converter in the vehicle body, and a wire harness configured to electrically connect the battery to the electric power converter and disposed between the battery and the electric power converter, wherein the weak portion is disposed at one of the first support portion and the second support portion which is opposite to the wire harness.

10. The vehicle body lower structure according to claim 2, further comprising a battery provided at one of a front and a rear of the electric power converter in the vehicle body, and a wire harness configured to electrically connect the battery to the electric power converter and disposed between the battery and the electric power converter, wherein the weak portion is disposed at one of the first support portion and the second support portion which is opposite to the wire harness.

11. The vehicle body lower structure according to claim 3, further comprising a battery provided at one of a front and a rear of the electric power converter in the vehicle body, and a wire harness configured to electrically connect the battery to the electric power converter and disposed between the battery and the electric power converter, wherein the weak portion is disposed at one of the first support portion and the second support portion which is opposite to the wire harness.

12. The vehicle body lower structure according to claim 5, further comprising a battery provided at one of a front and a rear of the electric power converter in the vehicle body, and a wire harness configured to electrically connect the battery to the electric power converter and disposed between the battery and the electric power converter, wherein the weak portion is disposed at one of the first support portion and the second support portion which is opposite to the wire harness.

13. The vehicle body lower structure according to claim 6, further comprising a battery provided at one of a front and a rear of the electric power converter in the vehicle body, and a wire harness configured to electrically connect the battery to the electric power converter and disposed between the battery and the electric power converter, wherein the weak portion is disposed at one of the first support portion and the second support portion which is opposite to the wire harness.

14. The vehicle body lower structure according to claim 7, further comprising a battery provided at one of a front and a rear of the electric power converter in the vehicle body, and a wire harness configured to electrically connect the battery to the electric power converter and disposed between the battery and the electric power converter, wherein the weak portion is disposed at one of the first support portion and the second support portion which is opposite to the wire harness.

15. The vehicle body lower structure according to claim 8, further comprising a battery provided at one of a front and a rear of the electric power converter in the vehicle body, and a wire harness configured to electrically connect the battery to the electric power converter and disposed between the battery and the electric power converter, wherein the weak portion is disposed at one of the first support portion and the second support portion which is opposite to the wire harness.

* * * * *